United States Patent
Calmet et al.

(10) Patent No.: US 12,520,825 B2
(45) Date of Patent: Jan. 13, 2026

(54) PIEZOELECTRIC DEVICE FOR THE TARGETED DIFFUSION OF ACTIVE MATERIAL IN ANIMALS

(71) Applicant: AB7 SANTE, Deyme (FR)

(72) Inventors: Christophe Calmet, Ramonville-Saint-Agne (FR); David Nguyen, Toulouse (FR); Arnaud Vilbert, Baziege (FR)

(73) Assignee: AB7 Sante, Deyme (FR)

( * ) Notice: Subject to any disclaimer, the term of this patent is extended or adjusted under 35 U.S.C. 154(b) by 525 days.

(21) Appl. No.: 17/786,377

(22) PCT Filed: Dec. 16, 2020

(86) PCT No.: PCT/FR2020/000278
§ 371 (c)(1),
(2) Date: Jun. 16, 2022

(87) PCT Pub. No.: WO2021/123519
PCT Pub. Date: Jun. 24, 2021

(65) Prior Publication Data
US 2023/0009305 A1    Jan. 12, 2023

(30) Foreign Application Priority Data
Dec. 16, 2019 (FR) ...................... 1914545

(51) Int. Cl.
A01K 27/00 (2006.01)
(52) U.S. Cl.
CPC ................. A01K 27/007 (2013.01)

(58) Field of Classification Search
CPC ... A01M 1/205; A01K 13/003; A01K 27/007; H10N 30/20; B05B 17/0646
See application file for complete search history.

(56) References Cited

U.S. PATENT DOCUMENTS 4,627,385 A    12/1986  Vinci
5,927,233 A    7/1999   Mainini et al.
(Continued)

FOREIGN PATENT DOCUMENTS

EP    0897755 A2    2/1999
EP    2797411 B1    10/2016
(Continued)

OTHER PUBLICATIONS

International Search Report and Written Opinion dated Mar. 29, 2021, issued in corresponding International Patent Application No. PCT/FR2020/000278, with its English translation, 36 pages.

*Primary Examiner* — Kimberly S Berona
*Assistant Examiner* — Steven J Shur
(74) *Attorney, Agent, or Firm* — Sheppard Mullin Richter & Hampton LLP

(57) ABSTRACT

The invention relates to a refillable device (1) for spraying an active substance, comprising a reservoir (2) containing at least one active substance, said device being equipped with a piezoelectric spraying mechanism (6). The device is attached to or in the collar of an animal. The invention also relates to the use of said device for spraying an active substance in a controlled manner from a distance in a desired direction. Said device can be used multi-directionally independently of the movements of the animal.

20 Claims, 7 Drawing Sheets

(56) References Cited

U.S. PATENT DOCUMENTS

| | | | |
|---|---|---|---|
| 6,296,196 B1 * | 10/2001 | Denen | B05B 17/0684 |
| | | | 239/102.1 |
| 8,714,113 B2 | 5/2014 | Lee, IV et al. | |
| 8,741,965 B2 | 6/2014 | Nouvel et al. | |
| 9,185,884 B2 | 11/2015 | Herrmann | |
| 11,185,052 B2 | 11/2021 | Weimin et al. | |
| 2008/0011875 A1 * | 1/2008 | Sipinski | B05B 17/0684 |
| | | | 239/326 |
| 2018/0303066 A1 * | 10/2018 | Weimin | A01K 15/021 |

FOREIGN PATENT DOCUMENTS

| | | |
|---|---|---|
| FR | 2625646 A1 | 7/1989 |
| FR | 2879482 A1 | 6/2006 |
| WO | 9313730 A1 | 7/1993 |
| WO | 0051747 A1 | 9/2000 |
| WO | 2008008459 A2 | 1/2008 |
| WO | 2013100167 A1 | 7/2013 |

* cited by examiner

PIEZOELECTRIC DEVICE FOR THE TARGETED DIFFUSION OF ACTIVE MATERIAL IN ANIMALS

CROSS REFERENCE TO RELATED APPLICATION

This application is a U.S. National Phase of International Application No. PCT/FR2020/000278, filed Dec. 16, 2020, which claims priority to French Patent Application No. FR1914545, filed Dec. 16, 2019, both of which are incorporated by reference herein in their entirety.

The invention relates to the field of diffusion devices and, more particularly, of aerosol diffusion devices of the ultrasonic nebulizer type whose vibration at high oscillation frequency allows the diffusion of particles. The invention relates more particularly to a device carried by an animal collar, equipped with a diffusion system of the piezoelectric type which can operate in a multidirectional manner, even in the event of movements of the animal to be treated.

Many active substance diffusion devices exist on the market. Most of these devices are "passive" devices that only require the movement of ambient air in order to disperse a liquid into the surrounding environment. Other devices are electrically powered by a battery or through a power supply socket. However, the latter case requires a power supply by cable and is thus only intended for the home, or at best for the passenger compartment of a vehicle.

Other diffusion devices use an ultrasonic transducer to spray a liquid solution of active substances into the air. However, there is currently no piezoelectric device attached to an animal's collar to treat it as best as possible with active substances, in particular repellent, soothing, antibacterial or antiseptic substances, even in the event of movement of the animal.

The state of the art refers to diffusion devices which operate by heating, in particular for wall sockets. The latter have the disadvantage of altering the active substances most sensitive to temperature, as is particularly the case with essential oils. In order to lower the usage temperature of wall sockets, it is known to formulate the active substances with solvents, including, in particular, those of the very volatile naphtha type. As a result, on the one hand, the treatment is diluted and, on the other hand, an organic solvent is released into the potentially toxic and flammable environment, which is undesirable.

In devices for animals, the repellent treatment is most often carried out by using a polymer matrix designed to release substances having this effect, or even by the application of formulations for spot-on pipettes, such as shampoos or lotions for pest control purposes, for example. The concentrations of active substances within the polymer matrices tend to decrease over time, the dosage and distribution of an active substance being, therefore, nonlinear throughout the duration of use. As to the antibacterial, antiseptic or so-called soothing active substances, they are reserved in the majority of cases for thermal diffusers which vaporize the active substance in the surrounding ambient air, which is therefore well suited for apartment animals. However, in the context of an application of repellent and/or soothing active substances, there is no practical solution making it possible to combine the characteristics of a nebulization of a solution of active substances with the aspect of a targeted and localized treatment of pre-existing applications.

Among the localized solutions, there are pneumatic aerosol devices, but these are not necessarily the most suitable because the active substance is released through propellants which can be flammable, or even toxic, at high doses. As for the case of polymer matrices, another drawback lies in the fact that the quantity of active substance diffused does not remain constant over the period of use of the aerosol device. Indeed, the propellant gas decreases as the number of uses increases, resulting in the gradual decrease in the release of active principle. In addition, pneumatic aerosol devices require that the incorporated active substances be diluted, thus limiting the usable concentration and, therefore, the effectiveness.

Among the diffusers worn by animals, mention may be made, in particular, of U.S. Pat. Nos. 4,627,385, 8,714,113 and 5,927,233 which disclose casings intended to be attached to a collar to deter a dog from barking. To do this, the diffuser is able to deliver, in response to the barking sound, an electric shock through electrodes, or sound signals, or an olfactory signal obtained by spraying lemongrass essential oil stored in a reservoir built into the casing. The reservoir is fitted with a solenoid valve whose opening is electronically controlled. These patents do not disclose or suggest the attachment of a piezoelectric system to a collar for use in the treatment of parasites or other pests.

As regards devices applied to animals, therapeutic inhalers for cattle are known from application WO1993013730A1. This type of inhaler comprises a piezoelectric diffusion system coupled to a respiratory mask designed to spray therapeutic substances in order to convey them through a pipe connecting the mask and the device. It is an aerosol therapy method used in the event of a vital emergency in the animal concerned, which makes it possible to avoid the diffusion of therapeutic substances into the surrounding air. This system is intended to be used on animals in respiratory distress and, therefore, motionless during a one-time treatment. This document in no way discloses a piezoelectric device attached to a collar for use on demand and on a moving animal. More generally, in the prior art, aerosol therapy treatments are poorly tolerated by animals to which a constraining mask must be applied. Nothing in the prior art is proposed to improve aerosol therapy devices for animals.

Application EP0897755A2 discloses an invention which relates to a piezoelectric liquid spraying device and to a method for repelling or eliminating harmful organisms. This patent discloses a method for killing and repelling insects by emitting atomized insecticide particles into the air. The liquid is atomized by the vibration generated by an electrical signal and does not need a pressurized gas tank. This method allows to reduce the size of the system. The size of the atomized particles is less than 20 μm. The amount of atomized active substances is 0.01 to 20 mg/h/m3. This document discloses a method for repelling and eliminating harmful insects by nebulizing at least one active substance. The active substances may be used alone or in a mixture and are of the chemical active type. This application does not disclose an ultrasonic device attached to a collar on a moving animal, or treatments based on pheromones or essential oils.

Document EP2797411B1 discloses an ultrasonic atomization device comprising a reservoir of solution containing a substance for pest control, chosen from the methofluthrin group. However, this document does not specifically disclose the use of a piezoelectric device attached to a collar, nor a soothing treatment.

Alternatively, U.S. Pat. No. 9,185,884B2 discloses a control collar for animals. This collar comprises a scent diffuser. However, the patent does not mention any piezoelectric device, nor does it mention any diffusion of active substances.

U.S. Pat. No. 8,741,965 discloses a method for behavior modification of an animal, in particular when stressed, whose purpose is to calm the animal. To that end, the invention consists in using soothing pheromones, in the form of a solution to be sprayed, or in the form of an active substance integrated into a polymer matrix designed to be worn by the animal. However, this document does not mention a piezoelectric device attached to a collar for the diffusion of active substances.

Taking the prior art into consideration, there is a need to provide piezoelectric devices suitable for being placed around the animal's neck and allowing localized treatment and/or in a given direction in order to better target the area to be treated.

Furthermore, there is also a need to provide a device that can operate in a multidirectional manner, regardless of the positioning of the device, allowing operation even on a moving animal. Multidirectional is understood to mean a device capable of effectively spraying an active substance regardless of the orientation of the device and the movements to which it is subjected.

Therefore, in order to achieve the mentioned objectives, there is a need to lighten, miniaturize and improve active substance spraying systems.

The device according to the invention proposes to meet these different needs.

Another advantage of the invention with regard to other diffusion systems is based on the use of a piezoelectric device which makes it possible to dispense with potentially dangerous solvents and flammable propellants.

Furthermore, the piezoelectric device according to the invention offers the possibility of using either pure or diluted active substances, thus offering the possibility of using broader active substance concentration ranges than with the pneumatic devices of the state of the art. It is thus easier to propose a range of values adapted to the desired effectiveness. The repellent active substances may thus, as appropriate, be used pure or very concentrated in solution, if necessary. Similarly, the soothing active substances may be used in a very diluted way without altering the spraying. In addition, the piezoelectric system according to the invention offers the advantage of keeping the concentration of active substances stable, over time and regardless of the number of uses.

The piezoelectric diffusion systems of the invention also make it possible to limit the losses of fragile active substances such as essential oils, in particular because of their sensitivity to heat. Indeed, said devices do not produce heat during operation and are, therefore, to be preferred for heat-sensitive active substances.

The currently known spray treatment means do not allow precise controlled dosage of the active substances. When it comes to treating the animal, it may prove necessary to benefit from a device allowing precise regulation of the doses to be administered while allowing treatment in motion and in a localized manner. This is what the piezoelectric system according to the invention allows.

The present invention makes it possible to fulfill the aforementioned objectives and overcome the drawbacks of the devices of the state of the art.

When an animal runs or walks, conventional systems, including piezoelectric systems, do not allow operation of the device while in motion and, in particular, in all directions that the movement of the animal imposes on the device.

Moreover, the conventional diffusion systems do not offer the possibility of diffusing in a targeted and localized manner towards a specific zone or another to be treated. Yet, it is useful to be able to have the animal permanently wear a device that can be activated when necessary.

In the case of an anxious or excited animal, it may prove necessary to soothe it quickly by diffusing the appropriate active substance. In such case, it is important to be able to target the ear-nose-and-throat (ENT) sphere.

Alternatively, when the animal suffers from itching and scratches itself, for example, on the chest, it will then be wiser to spray an anti-itch, repellent or even insecticide spray towards the body of the animal in order to relieve it or to treat it. Thus, it is necessary to have a portable device which offers the modularity functions of spraying, stream orientation and mobility of such a device.

The purpose of the present application is to propose a novel piezoelectric device, and a novel application of this device in animals.

Animal is understood to mean any animal capable of wearing a device as described in the present invention. Preferably, animal is understood to mean a domestic animal such as a cat, a dog or a horse.

An objective of the present invention is to provide a piezoelectric device, and its use for the diffusion of active substances, in particular pest repellents, soothing or pain-relieving substances, placed near the neck of an animal, which is capable of effectively reaching the desired areas of the body to be treated. For example, in the case of pest repellent products, it may be, in particular, the belly, the chest, the legs and the flanks. Indeed, it is known, for example, that the tick infestation routes to reach the lower parts of the pet's body are the legs. For the diffusion of soothing, anti-stress active substances, it will be preferable to diffuse towards the ENT sphere to allow inhalation of the active substances. For the distribution of painkiller active substances, the device may be directed towards any zone of the body to be treated, for example the back.

Another objective is to provide an automated device designed to diffuse particles containing the active materials of a size allowing the production of a cloud or fog towards the areas of interest on the animal's body, or so that the active substances are suitable for inhalation.

It is obvious that the realization of the device according to the invention takes into account the technical constraints related to miniaturization, the stability of the active substance in the liquid as well as its effectiveness on the targets, and the practicality for both the animal and its master. Indeed, wearing the device must not hinder or encourage the animal to remove it.

Consequently, the object of the present invention is a rechargeable spraying device comprising a reservoir containing at least one active substance, said device being equipped with a piezoelectric spraying mechanism making it possible to spray said active substance in a controlled and remote manner, characterized in that said device is attached to the collar of an animal.

The present invention also relates to the use of said device, characterized in that it is attached to the animal's collar and can be used in a multidirectional manner, independently of the movements of the animal. Usable in a multidirectional way is understood to mean that the piezoelectric system can be activated for the diffusion of the active substance regardless of the movement or position of the animal and, therefore, of the device worn. Whether the animal is standing, lying down, motionless or in motion, the device according to the invention, whether it is positioned horizontally, vertically or "upside down" remains functional and makes it possible to diffuse the active substance effectively.

Rechargeable device is understood to mean that the device can, by means known to a person skilled in the art, be refilled after use when the reservoir is empty. The reservoir can, as such, be included in the form of a cartridge to be changed, or comprise a filling valve directly integrated into the surface of the reservoir.

The device according to the invention consists of a nebulization body (1) and a reservoir (2) as shown in FIG. 1. The nebulization body comprises the casing containing the sealing system, the piezoelectric system, the electronic board and the battery powering the system. In a particular embodiment, the nebulization body may be equipped with an orientation mechanism of the piezoelectric system, making it possible to spray in defined directions. In the remainder of the application, the reservoir of the device according to the invention will be defined either as a reservoir or a "cartridge," and said cartridge may be, without distinction, a refillable and reusable cartridge or a disposable cartridge.

In a preferred embodiment, the reservoir (2) is a cartridge (3) comprising a wick (4) to be soaked, of a length chosen according to the size of the reservoir, which is similar to a substantially cylindrical cartridge. This wick is inserted longitudinally within the cylindrical cartridge which comprises a dispensing opening at one of its ends and a bottom at the other. The dispensing opening has a diameter smaller than the diameter of the cylinder and is provided to accommodate the wick. Therefore, said wick fills the space at the outlet of the cartridge and protrudes from the latter. The adequacy between the diameter of the wick and that of the opening of the reservoir advantageously makes it possible to avoid superfluous and unwanted outflows caused by the constraints of the movement and, therefore, to ensure a first seal between the wick and the dispensing opening.

Preferably, the wick is flexible and made of woven fibers of the cellulose type or derivatives, treated to be water-repellent or not. In another embodiment, the wick may be rigid, in porous material of the ceramic or plastic type. A person skilled in the art will adapt the nature of the wick to that of the active substance to be delivered.

In the device according to the invention, the wick is cylindrical in shape, its ends having flat surfaces, as shown in FIG. 2. The piezoelectric pad is then in contact with the entire flat surface of the wick. In this embodiment, the emission of the fog will be in a single direction, perpendicular to the surface of the wick.

In an alternative embodiment, the surface of the wick in contact with the piezoelectric pad has a rounded shape, in the shape of an ogive or preferably hemispherical. In this variant, the device according to the invention has the advantage of allowing on-demand orientation of the piezoelectric pad in contact with the wick. Furthermore, this shape maintains regular contact with the center of the perforated membrane located on the piezoelectric pad, regardless of the orientation of the latter. This allows a supply of liquid to the piezoelectric cell in sufficient and constant quantity, while reducing the tensions on the pad, a fragile component of the system. Thanks to this variant, the device makes it possible to modify the orientation of the piezoelectric pad and, therefore, to define a specific direction chosen for the spraying according to the indication (FIG. 5).

In a particular embodiment, the orientation mechanism of this embodiment comprises a ball-and-socket type mechanism (7) to allow the pivoting of the piezoelectric system around the vertical axis of the nebulization body (1). This mechanism not only makes it possible to direct the nebulization more precisely towards the targeted areas, but it also makes it possible to secure the risks of accidental spillage of the liquid contained in the reservoir (2) of the device during movement, which also contributes to strengthen the sealing of the system. The use of such a ball-and-socket for the orientation mechanism also makes it possible to simplify the miniaturization of the device by making it compact and more suitable to be used on an animal in motion.

The orientation mechanism (7) of the piezoelectric pad is based on a ball-and-socket type connection between two separate parts. As such, it comprises a mobile part (8') of spherical or hemispherical shape, supporting the piezoelectric pad and its specific seal, but also a fixed part (8), preferably of hemispherical shape, constituting the frame into which the mobile part is embedded so as to allow the latter to rotate in order to direct the nebulization at the outlet of the device.

The angle and direction of the treatment are defined by said mechanism and depend on the intended application. The maximum orientation angle of the pad (6) by the orientation system (7) is 45° C. with respect to the axis of the wick (4 or 4') in all directions. The inclination of the pad on the wick is thus limited to 45° in order to ensure permanent and optimal contact between the wick (4 or 4') and the piezoelectric pad (6).

It is possible to enhance this mechanism by locking the angle, either by adding a notching mechanism, or by a specific treatment of the surfaces in contact to control their roughness.

In an embodiment where the wick of the device remains vertical, the orientation mechanism (7) of the piezoelectric pad (6) advantageously makes it possible to direct the spray in a chosen direction without having to tilt the device and, consequently, to maintain the optimum impregnation of the wick (4 or 4'), even in the case of partially empty or inclined reservoirs, in order to ensure the continuity of the liquid supply until the latter is completely consumed. This problem is frequently encountered in spraying devices provided with a dip tube which, when the reservoir is empty, can no longer spray when they are tilted. Thus, the present invention overcomes this drawback of dead volume or volume accessible to the dip tube.

According to a preferred embodiment, the seal between the reservoir (2) and the nebulization body (1) is ensured by a joint system (5) particularly suited to the device according to the invention. The seal will preferably be in the form of an O-ring, in an elastic material chosen from materials such as acrylonitrile butadiene rubber, fluorinated rubber, fluorosilicone rubber, polyacrylate, ethylene acrylate rubber, perfluorinated rubber, silicone, EPDM, fluorinated ethylene propylene copolymer, polytetrafluoroethylene, or polyurethane. The seal will be chosen from among those with a hardness between 50 and 100 shore A to allow both easy reservoir change and good mechanical strength of the refill once inserted. This seal system is arranged in a groove specially adapted to ensure tightness and optimized positioning of the refill cartridge during the mechanical stresses induced when recharging the device or during the movements of the animal.

Within the meaning of the invention, the reservoir or the cartridge may be made of known materials conventionally used such as glass, plastic or any other material that a person skilled in the art deems suitable for the invention.

It is understood that the cartridge will be filled with the active substance before inserting the wick. The active substance can then diffuse from the cartridge towards the dispensing opening after rising through the wick according to the phenomenon of capillarity.

Advantageously, contacting the active substance with the piezoelectric element (6) will take place when the active substance is transported along the wick to its end by capillarity. The active substance can thus be nebulized in the form of a cloud of particles. Within the meaning of the invention, it is understood that the particles are droplets of a liquid solution.

The piezoelectric system according to the invention also allows a certain modularity in terms of the concentrations of active substances that can be used, unlike in pressurized pneumatic systems. Indeed, the device of the present invention makes it possible, surprisingly, to work with very concentrated compositions of active substances, or even with pure active substances, therefore without using solvents, and thus to gain in efficiency when using dose-dependent active substances.

In a particular embodiment according to the invention, the active substance is a substance formulated within a liquid composition so that it can come into contact with the piezoelectric device whose vibration frequency will make it possible to atomize the liquid and disperse said substance as a cloud or mist.

According to the present invention, the liquid composition containing the active substance is of the aqueous, alcoholic, aqueous-alcoholic or oily type, or in the form of an emulsion whose nature will be adapted to the active substance. According to a particular embodiment, the composition is exclusively composed of the pure active substance, without solvent. According to another embodiment, the active substance is diluted within the composition by means of at least one solvent.

In a known manner, the active materials are formulated in an appropriate solvent. Examples of solvents that may be used include, in particular, aromatic or aliphatic hydrocarbons, halogenated hydrocarbons, aromatic or aliphatic alcohols, esters, ethers and ketones, or water. More preferably, the solvents that may be used are triglycerides, such as vegetable or animal oils, or alcoholic solvents, such as ethanol.

Formulation adjuvants, well known in the field, such as, for example, stabilizers, surfactants, synergizing agents or antimicrobial agents may also be added.

In a preferred variant, the active substance according to the present invention represents between 0.01% and 100% of the liquid composition, preferably between 0.1% and 50% and even more preferably between 0.5% and 30%.

According to one embodiment, the active substance is chosen from an insecticide, a repellent, an odoriferous agent, an anti-stress, an energizing agent, a cosmetic hair care agent, an anti-itch agent, an active substance for the treatment of respiratory diseases, a pain reliever, or mixtures thereof.

The insecticides and repellents of the present invention, which are conventionally used in the fight against the aforementioned harmful organisms, are known to a person skilled in the art. For example, insecticides and repellents are chosen, in particular, from the group formed by pyrethroids, pyrethrins and their derivatives, carbamates, formamidines, carboxylic esters, N,N-diethyl-3-methylbenzamide (DEET), icaridine, phenylpyrazoles, organophosphorus compounds, organohalogen compounds, neonicotinoids, avermectins and their derivatives, spinosyns, essential oils and their constituents such as terpenes and their derivatives (alcohols, esters, aldehydes) and sesquiterpenes and their derivatives (alcohols, esters, aldehydes).

In a preferred embodiment variant, the active substance is a repellent or an insecticide which is chosen from essential oils such as lavandin essential oil, lemon *eucalyptus* essential oil, lemongrass, lavender, neem, peppermint, spearmint, pennyroyal, wintergreen or basil, or a mixture thereof.

According to a variant of the invention, the repellents are chosen from constituents of essential oils such as geraniol, limonene, menthol, alpha pinene, linalool, citriodiol, citronellal or a mixture thereof.

The odoriferous agent may be of natural or synthetic origin and is chosen from perfumes, aromas, essential oils and their constituents.

The anti-stress or the soothing agent may be a vegetable oil such as hemp oil, in particular rich in cannabinoids, or an essential oil such as the essential oil of valerian, *Nepeta cataria*, pine, tangerine, bitter orange, verbena, ravintsara, chamomile, lavender, marjoram, ylang-ylang, rosemary, *eucalyptus* or mint, or a pheromone or mixtures thereof.

The anti-itching agent may be an essential oil, a fatty alcohol, an ester, a fatty acid and its esters, vitamins or mixtures thereof.

The cosmetic hair care agent can be a fatty substance such as alcohols, esters, vegetable oils, glycerides, acids, ceramides, or vitamins.

Active substance for the treatment of respiratory diseases is understood to mean any active substance which can treat the respiratory pathologies of the animal airways or nasal passages, such as asthma or chronic bronchitis. The active substance may be chosen from a corticosteroid, a bronchodilator, a bronchial thinner, an antihistamine or any other treatment suitable for the pathology.

The painkiller may be an essential oil, monoterpene alcohols, monoterpene aldehydes, monoterpene esters or mixtures thereof, cannabinoid derivatives, preferably without THC, in particular derived from hemp oil. Particularly preferred is the use of methyl salicylate, menthol, essential oil of wintergreen, juniper, peppermint, lemon *eucalyptus* or hemp oil.

Antibacterials and/or antiseptics may be essential oils, monoterpene alcohols, monoterpene aldehydes, monoterpene esters, or hydroalcoholic derivatives or mixtures thereof. Particular preference will be given to lavandin, essential oil of grapefruit, lemon, tea tree, marjoram, *Eucalyptus radiata*, ravintsara or mixtures thereof.

Within the context of the invention, the aforementioned active materials may be used alone or in combination depending on the intended purpose.

As stated above, the device according to the invention also comprises a piezoelectric element well known to a person skilled in the art. By way of example, said device comprises, in particular, a piezoelectric ceramic pad that is brought into contact with the solution in order to nebulize it through the wick. The piezoelectric pad is covered with a perforated membrane, in which the perforation size may vary from 1 to 40 μm, preferably from 3 to 20 μm. When activated, the pad vibrates at a frequency between 75 and 190 kHz. According to the invention, it is possible to target a particular size of particles to be nebulized by varying the size of the perforations and the frequency of vibration.

According to the present invention, the liquid composition is sprayed in the form of particles with an average diameter of between 1 μm and 40 μm. The size of the particles is adapted to the intended use. The size of the sprayed particles is modulated, on the one hand, with the vibration oscillation frequency of the piezoelectric pad of the device and, on the other hand, it is dependent on the size of the microperforations of the membrane of the piezoelectric device.

According to a particular embodiment, in the case of diffusion of active substances against pests, the composition of the active substance will preferably be sprayed in a particle size of between 10 and 40 μm, more preferably between 20 and 40 μm.

In a preferred embodiment, when the active substance is a liquid solution of soothing, pain-relieving or active substances for the treatment of respiratory diseases, it is appropriate to target the ear-nose-and-throat sphere in a privileged manner. It is necessary that the spraying be done preferably towards the muzzle or the olfactory system of the animal in order to reach the target organ and to allow the inhalation of the active substances. Therefore, it is appropriate that the diameter of the drops be suitable to nebulize the soothing active solution for inhalation. Drops generated by the device according to the invention have a diameter of between 1 μm and 20 μm, preferably between 1 and 10 μm, to allow optimal inhalation.

Within the meaning of the present application, the pure active substances or formulations containing the active substance(s) must be integrated into the reservoir of the device as described above. The device must be able to be used on a moving animal and in all directions. Thus, said device should be attached to the animal by means of a harness or collar, preferably a collar, and the device should be removable.

The fastening means of the device according to the invention are chosen from a self-gripping tape, lace or adhesive system, a press-button system, a notching system or any other fastening means well-known to a person skilled in the art.

In a particularly advantageous embodiment, the fastening means can make it possible to modify the orientation and the spraying depending on the desired effect. To this end, provision is also made for the device according to the invention to be able to benefit from a rotary or adjustable attachment system attached to the collar. In such a particular embodiment, the fastening means are mounted on a rotating fastener clipped to the collar. The piezoelectric device will be attached to a rotating support which will then be able to ensure a 360-degree distribution of the active substances. In a particular embodiment involving spraying repellent or insecticide active substances, the spray is preferably directed towards the chest, the flanks of the animal, and/or the lower parts of the animal's body. In the case of soothing substances and/or painkillers, the spray will preferably be directed towards the ENT sphere for inhalation.

Therefore, according to the present invention, the use of the device offers the advantage of generating a spray in different chosen directions. On the one hand, the device according to the invention allows operation in all directions and can be oriented according to the zones to be reached, in particular through its fastening means on the collar. On the other hand, the use of a wick with a hemispherical end within the device makes it possible to orient the piezoelectric pad in contact with said wick in a given direction.

According to the present invention, the piezoelectric spraying mechanism of the device comprises an electronic board. Said electronic board allows the activation of the piezoelectric system. According to a particular embodiment, the activation may be done by pushing a button, directly and manually, on the device. In a preferred embodiment, the electronic board makes it possible to control and/or trigger the spraying remotely. In a particular embodiment, the triggering is carried out by means of programming, which can define the days and/or hours and/or spraying times. In another variant, the triggering is carried out on demand through a remote control. A person skilled in the art will adapt the appropriate remote activation system to the device according to the invention.

Therefore, the invention relates to a rechargeable device for spraying an active substance comprising: a removable reservoir containing a wick and at least one active substance, a nebulization body containing a piezoelectric spraying mechanism, a seal ensuring tightness between said reservoir and said nebulization body, characterized in that the device is attached to or in the collar of an animal.

The invention relates to said device characterized in that it can be oriented in multiple directions.

The device according to the invention is characterized in that the piezoelectric spraying mechanism comprises a piezoelectric pad in contact with the active substance, said pad vibrating at a frequency of between 75 and 190 kHz and being covered with a perforated membrane whose perforations are between 1 and 40 μm in size.

The device according to the invention is characterized in that the piezoelectric pad is in contact with a wick whose end is planar or hemispherical.

The device according to the invention is characterized in that the active substance is an insecticidal, repellent, painkiller or soothing active substance and represents 0.01% to 100% by weight of a liquid composition.

The device according to the invention is characterized in that the liquid composition is sprayed in the form of particles with an average diameter of between 1 μm and 40 μm.

In summary, the invention relates to a rechargeable spraying device comprising: (a) a removable reservoir containing at least one active substance, (b) a piezoelectric spraying mechanism comprising a piezoelectric element controlled by an electronic board, (c) characterized in that said device is attached to or in the collar of an animal. Said reservoir comprises a dispensing opening through which a wick makes it possible to direct the active substance towards the piezoelectric element regardless of the direction of use of the device. The tightness of the assembly is ensured by a joint system between the reservoir and the nebulization body of the device, chosen to allow the reservoir to be filled or refill cartridge to be changed.

The invention also relates to the use of a rechargeable device for spraying an active substance comprising a reservoir containing at least said active substance, and a piezoelectric spraying mechanism, characterized in that the device is intended to be fastened on or in the collar of an animal.

The use of the device is characterized in that the device is usable in a multidirectional way and independently of the movements of the animal.

The use of the device is also characterized in that the device makes it possible to spray the active substance in a localized manner on a target zone of the animal.

The use of the device is characterized in that the liquid composition containing the active substance is sprayed in the form of particles with an average diameter of between 1 μm and 40 μm.

The use of the device is characterized in that the spray is aimed at the ear-nose-and-throat sphere of the animal or the belly, chest, legs or flanks of the animal.

Therefore, the invention relates to the use of a device equipped with a piezoelectric spraying mechanism making it possible to spray said active substance in a controlled and remote manner.

FIGS. 1 to 6 show an example of a device according to the invention, without limiting its shape.

FIG. 4 represents the case where the piezoelectric pad (6) is placed on a wick with a flat end (4).

FIG. 5 represents the case where the piezoelectric pad (6) is placed on a wick with a hemispherical end (4') making it possible to orient the cell in order to direct the spray in a chosen direction.

The present invention is illustrated by means of the following non-exhaustive and non-limiting examples:

EXAMPLE 1: DIFFUSION DEVICE FOR ANTI-TICK AND FLEA ACTIVE SUBSTANCES FOR DOGS

A prototype of a device for the distribution of active substance against ticks and fleas was produced. The device consists of the assembly comprising:
- a hemispherical polypropylene casing, 4 cm in diameter and 2 cm in height,
- an alcoholic solution comprising an essential oil of lavandin which represents 5% by weight of the composition, contained in a cylindrical polypropylene reservoir, 3 mL in volume (3 cm in diameter, 0.44 cm in height), the reservoir being provided with an outlet orifice,
- a cellulose wick whose role is to convey the liquid from the reservoir to the piezoelectric pad,
- a nitrile rubber O-ring to ensure the seal between the reservoir and the hemispherical casing,
- a piezoelectric ceramic pad (PZT4 SMMOD10F190, Steminc) in contact with the solution, allowing it to be nebulized. The toric-shaped piezoelectric pad (16 mm in external diameter, 3 mm in height) is covered with a perforated membrane (perforation size 3-20 µm over an area 4 mm in diameter). The pad vibrates at a frequency of 110 kHz,
- an electronic control board allowing manual activation of the piezoelectric pad using a push button located in the center of the hemisphere of the casing to activate the spray,
- a 3.7 V, 300 mAh and 1.11 Wh battery supplying the device (29×19×5 mm),
- a filling orifice located on the casing, and fitted with a flexible silicone cap to allow the reservoir to be filled with active liquid,
- a connector fitted with a USB port to allow the battery to be recharged,
- the entire device just described is attached to a nylon collar provided with a collar-loop type closure means such as Velcro, for example. The device is fastened in order to spray the solution downwards, with the liquid reservoir pointing upwards, This device is designed so that a mist of active material is formed at the outlet of the nozzle, moving along the lower parts of the wearer's body in order to protect it against infestations by the targeted parasites (ticks and fleas). The electronic circuit board was programmed to allow activation of the pad for 20 seconds, for a nebulized volume of approximately 77 µL. The autonomy of the battery makes it possible to trigger approximately 100 activations before fully recharging.

EXAMPLE 2: DIFFUSION DEVICE FOR ANTI-TICK AND FLEA ACTIVE SUBSTANCES FOR DOGS

Figure 1:
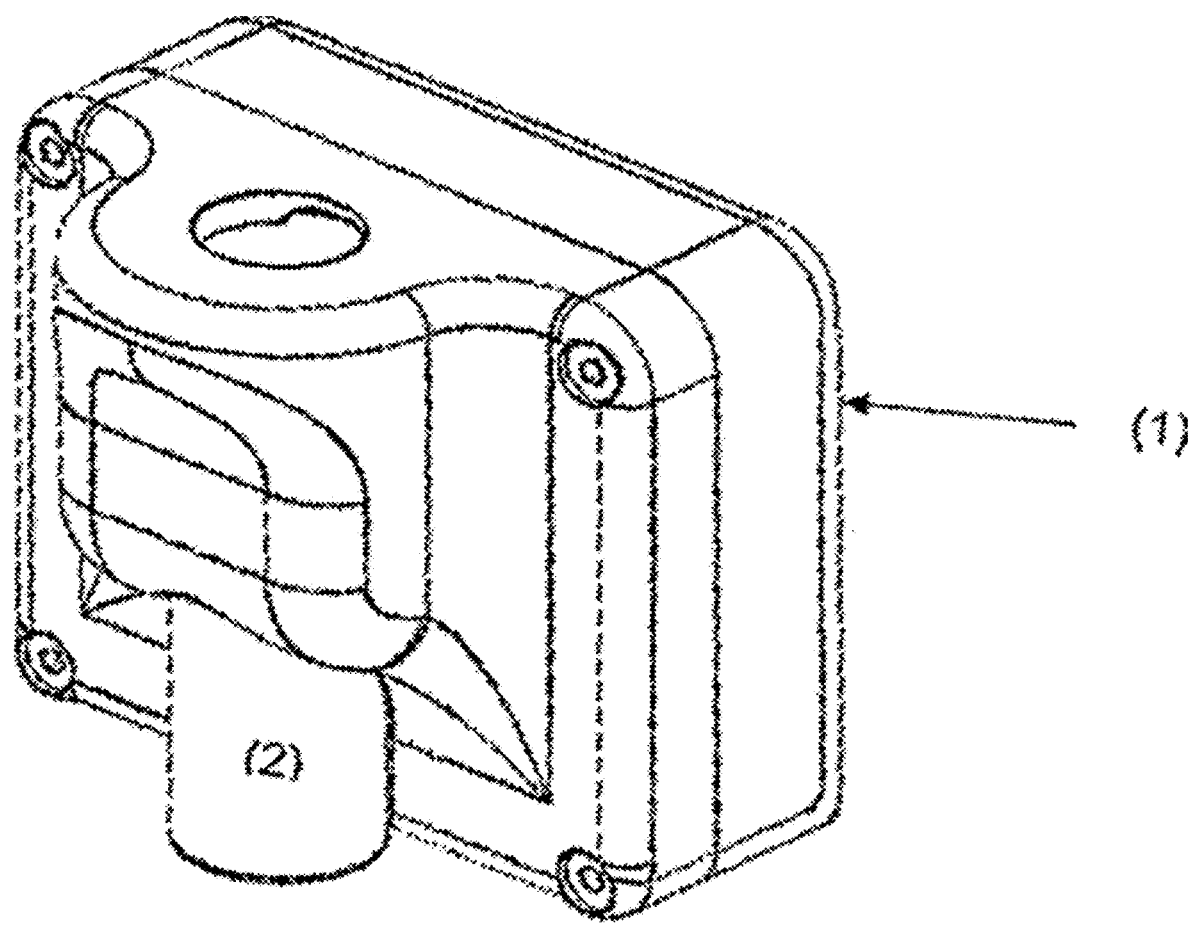
FIG. 1 represents an example of a complete device according to the invention consisting of the two main parts, namely, the body of the device constituting the nebulization body (1) and the reservoir (2) embedded within the nebulization body (1).
Figure 2:
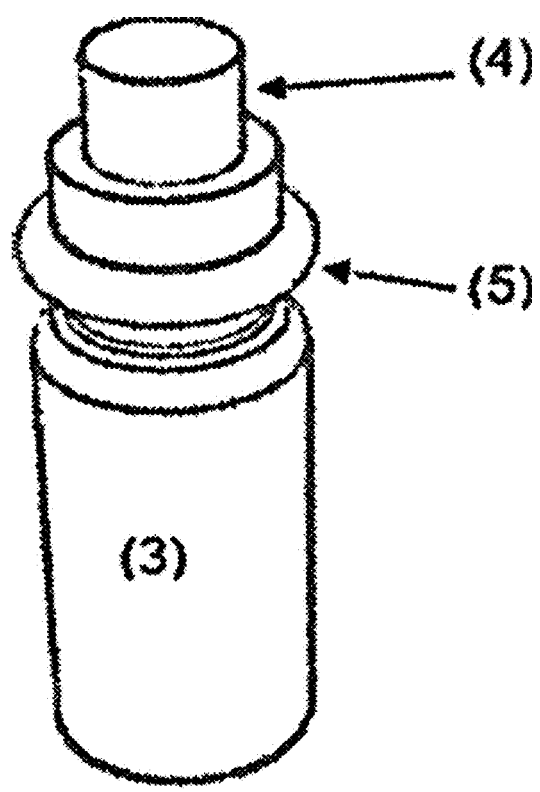
FIG. 2 represents the reservoir (2) consisting of the cartridge part (3) containing the active substance or the composition comprising the active substance, within which is fastened a wick (4) with a flat end. A seal (5) ensures the tightness between the reservoir and the nebulization body when the reservoir is in place within the device.
Figure 3:
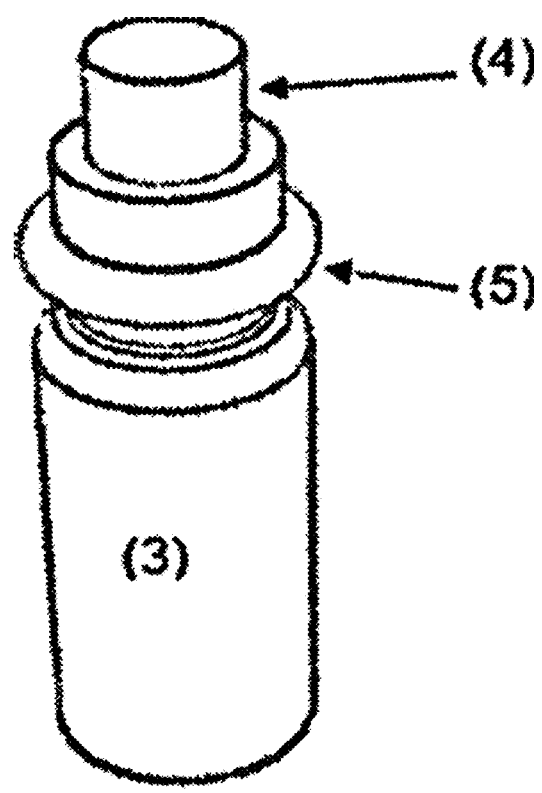
FIG. 3 represents an alternative to the reservoir (2) consisting of the cartridge part (3) containing the active substance or the composition comprising the active substance, within which is fastened another variant of wick (4') having a rounded, hemispherical end.
Figure 4:
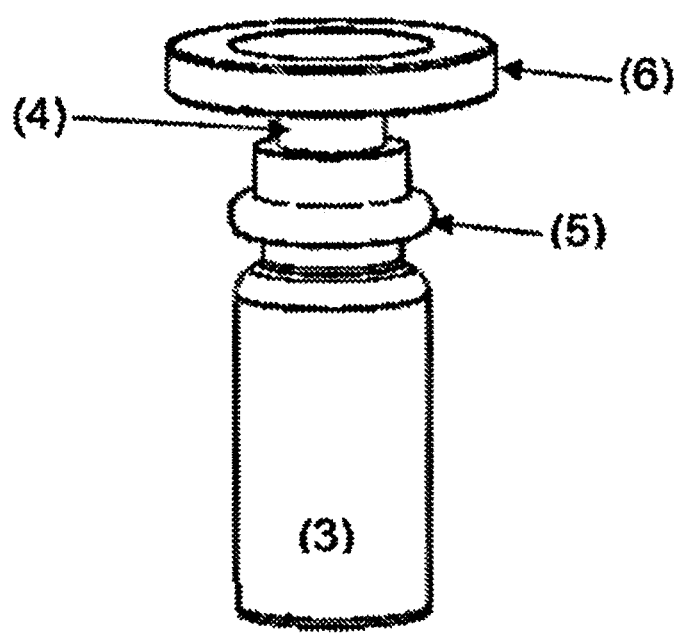
FIG. 4 and FIG. 5 represent the reservoir with the piezoelectric pad (6) in place as it is arranged within the element of the nebulization body.
Figure 5:
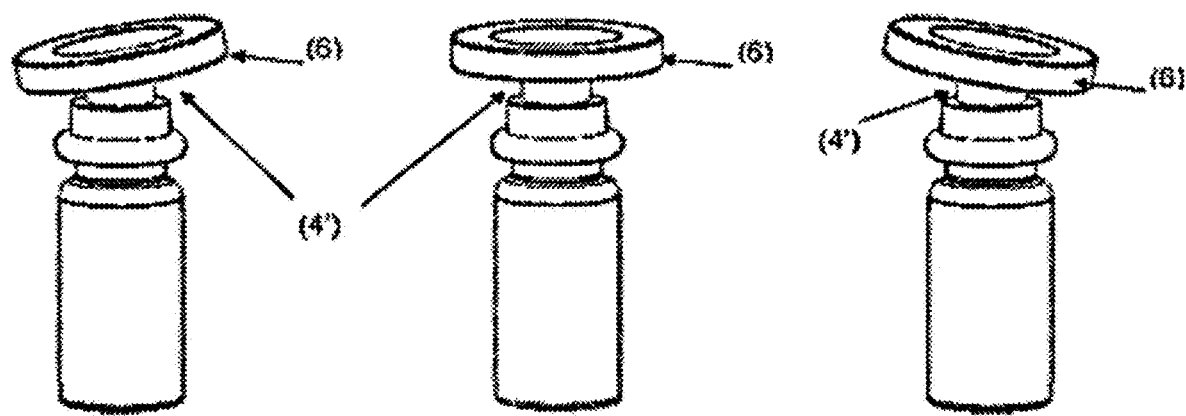
Figure 6:
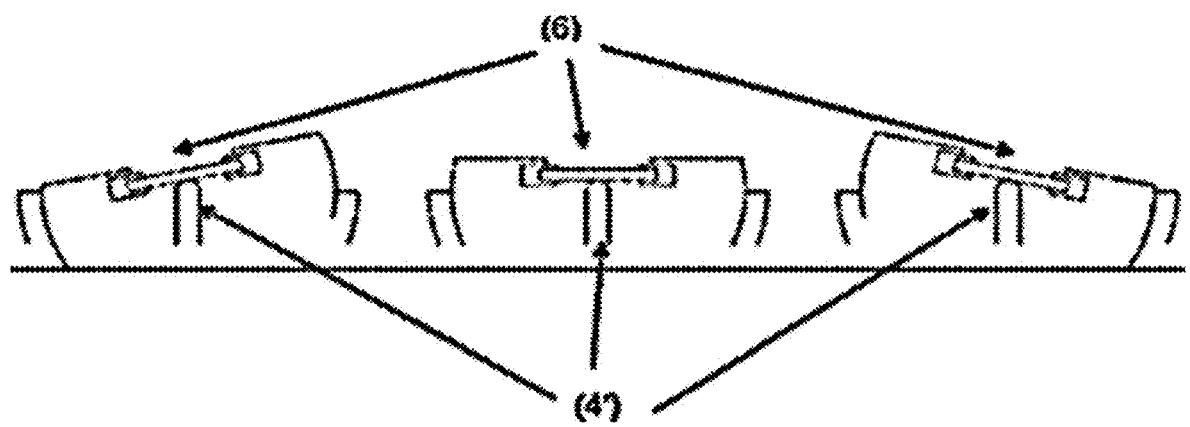
FIG. 6 shows an enlargement of the orientation system of the piezoelectric pad (6) when the latter is in contact with the active substance through a hemispherical wick (4'). In this particular embodiment, the piezoelectric pad is embedded within a tilting system making it possible to choose an orientation to give to the piezoelectric pad, thus directing the spray in the desired direction.
Figure 7:
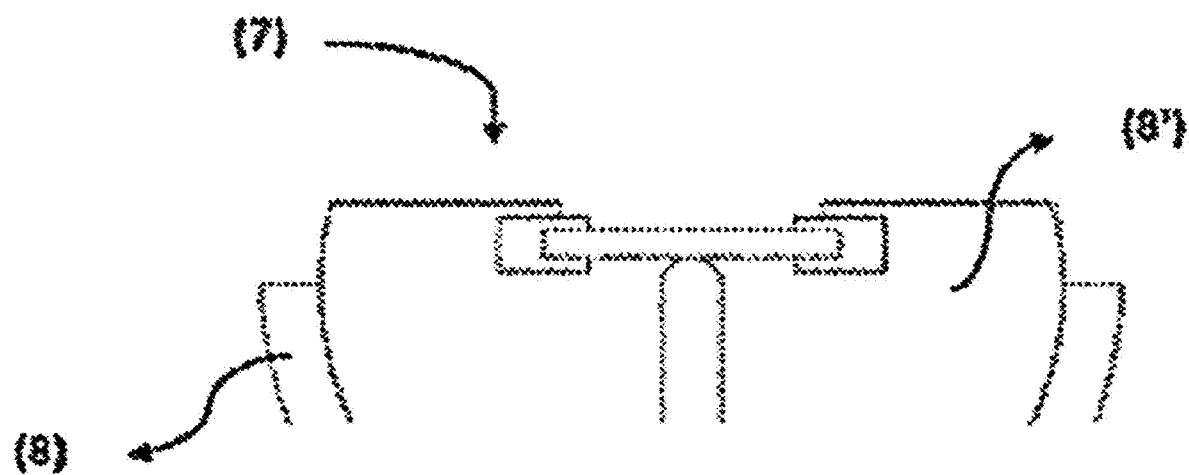
FIG. 7 represents the orientation system of the piezoelectric pad and, in particular, the detail of the ball-and-socket type mechanism (7) consisting of a fixed part (8) and a mobile part (8') embedded within said fixed part (8).

A prototype of a device for the distribution of repellent active material against fleas and ticks was produced. The device consists of the assembly comprising:
- a casing in the shape of a block, 4 cm wide, 3.5 cm high and 1.5 cm deep, on which there is a protuberance to house the piezoelectric pad (see FIG. 1) as well as a groove inside which a seal can be housed.
- a solution based on tangerine essential oil and Ceylon citronella essential oil (50/50) with repellent properties against ticks and fleas, contained in a cylindrical glass reservoir, 1.5 mL in volume (1.1 cm in diameter, 3 cm in height), the reservoir being provided with an outlet orifice,
- a piezoelectric ceramic (PZT4 SMMOD10F190, Steminc) in contact with the solution, allowing it to be nebulized. The toric-shaped piezoelectric pad (16 mm in external diameter, 3 mm in height) is covered with a perforated membrane (perforation size 3-20 µm over an area 4 mm in diameter). The pad vibrates at a frequency of 110 kHz,
- a hydrophobic treated cellulose wick, 6 mm in diameter and 3.5 cm in height, whose role is to convey the mixture of essential oils from the reservoir to the piezoelectric pad,
- an 11 mm diameter nitrile rubber O-ring to ensure the seal between the reservoir and the hemispherical casing
- an electronic control card allowing manual remote activation of the piloting of the piezoelectric system using
- a remote control allowing activation of the spray, located in the center of the hemisphere of the casing,
- a 3.7 V, 300 mAh and 1.11 Wh battery supplying the device (29×19×5 mm),
- a connector fitted with a USB port allowing the battery to be recharged,
- the entire device just described is attached to a nylon collar provided with a loop type closure means.

the assembly is placed on the collar in order to spray the solution downwards on the animal. This device is designed and placed on the animal in such an orientation that at the outlet of the nozzle, a mist of active material is formed which moves along the lower parts of the animal and thus protects the wearer against flea or tick bites. The electronic circuit board was programmed to allow activation of the pad for 4 seconds, for a nebulized volume of approximately 17 µL. The autonomy of the battery makes it possible to trigger approximately 500 activations before fully recharging.

EXAMPLE 3: DIFFUSION DEVICE FOR SOOTHING ACTIVE SUBSTANCE FOR CATS

A device prototype was produced for the diffusion of a soothing composition for cats. The device consists of the assembly comprising:
- a casing in the shape of a block, 4 cm wide, 3.5 cm high and 1.5 cm deep, on which there is a protuberance to house the piezoelectric pad, as well as a groove inside which a seal can be housed.
- a solution based on *Nepeta cataria* essential oil and hemp essential oil, rich in cannabinoids without THC (50/50) with soothing and pain-relieving properties, diluted in ethanol up to 10%, contained in a cylindrical glass reservoir, 1.5 mL in volume (1.1 cm in diameter, 3 cm in height), the reservoir being provided with an outlet orifice,
- a cellulose wick, 6 mm in diameter and 3.5 cm in height, with a hemispherical end, whose role is to convey the mixture of essential oils from the reservoir to the piezoelectric pad,
- an 11 mm nitrile rubber O-ring to ensure the seal between the reservoir and the hemispherical casing
- a piezoelectric ceramic (PZT4 SMMOD10F190, Stem-inc) in contact with the solution, allowing it to be nebulized through the hemispherical wick. The toric-shaped piezoelectric pad (16 mm in external diameter, 3 mm in height) is covered with a perforated membrane (perforation size 1-10 µm over an area 4 mm in diameter). The pad vibrates at a frequency of 110 kHz,
- an electronic control board allowing manual remote activation of the piloting of the piezoelectric system using a remote control allowing activation of the spray, located in the center of the hemisphere of the casing,
- a 3.7 V, 300 mAh and 1.11 Wh battery supplying the device (29×19×5 mm),
- a connector fitted with a USB port allowing the battery to be recharged,
- the entire device just described is attached to an EVA collar fitted with a buckle-type closure means,
- the assembly is placed on the collar in order to spray the solution towards the top of the animal.

This device is designed and placed on the animal in such an orientation that, at the outlet of the nozzle, a mist of active material is formed which is directed towards the ENT sphere of the cat. The electronic circuit board was programmed to allow activation of the pad for 10 seconds, for a nebulized volume of approximately 38 µL. The autonomy of the battery makes it possible to trigger approximately 200 activations before fully recharging.

The invention claimed is:

1. An animal collar for controlled, repeated administration of a precise volumetric treatment dose of at least one active substance to an animal in need thereof, the collar comprising a rechargeable spraying device for the at least one active substance, wherein the rechargeable spraying device comprises:
   - a removable reservoir comprising a wick and the at least one active substance,
   - a nebulization body comprising a piezoelectric spraying mechanism, and
   - a seal providing tightness between said reservoir and said nebulization body;
   wherein the rechargeable spraying device is attached to or in the collar;
   wherein the rechargeable spraying device can be used for the controlled, repeated administration of the precise volumetric treatment dose of the at least one active substance to the animal in need thereof; and
   wherein the piezoelectric spraying mechanism comprises a ball-and-socket mechanism.

2. The collar according to claim 1, wherein the piezoelectric spraying mechanism comprises a piezoelectric pad in contact with the at least one active substance, said pad vibrating at a frequency comprised between 75 and 190 KHz and being covered with a perforated membrane whose perforation size is between 1 and 40 µm.

3. The collar according to claim 2, wherein the piezoelectric pad is in contact with the wick whose end is planar.

4. The collar according to claim 2, wherein the piezoelectric pad is in contact with the wick whose end is hemispherical.

5. The collar according to claim 1, wherein the nebulization body is equipped with an orientation system for the piezoelectric spraying mechanism.

6. The collar according to claim 1, wherein the at least one active substance is an insecticidal, repellent, painkiller, soothing, antibacterial or antiseptic active substance.

7. The collar according to claim 1, wherein the active substance represents 0.01% to 100% by weight of a liquid composition.

8. The collar according to claim 7, wherein the liquid composition is sprayed in the form of particles with an average diameter of between 1 µm and 40 µm.

9. A method of administering a precise volumetric treatment dose of at least one active substance to an animal in need thereof in a controlled and repeated manner, the method comprising administering the at least one active substance with an animal collar comprising a rechargeable spraying device for the at least one active substance, wherein the rechargeable spraying device comprises:
   - a removable reservoir comprising a wick and the at least one active substance,
   - a nebulization body comprising a piezoelectric spraying mechanism, and
   - a seal providing tightness between said reservoir and said nebulization body;
   wherein the rechargeable spraying device is attached to or in the collar;
   wherein the rechargeable spraying device can be used for the controlled, repeated administration of the precise volumetric treatment dose of the at least one active substance to the animal in need thereof;
   wherein the piezoelectric spraying mechanism comprises a ball-and-socket mechanism; and
   wherein the rechargeable spraying device operates in a multidirectional manner and independently of any movements of the animal.

10. The method of claim 9, wherein the rechargeable spray device sprays the at least one active substance in a localized manner on a target zone of the animal.

11. The method of claim 10, wherein the spraying targets the ear-nose-and-throat sphere of the animal.

12. The method of claim 9, wherein the rechargeable spraying device's piezoelectric spraying mechanism makes it possible to spray the active substance in a controlled and remote manner.

13. The method of claim 9, wherein the spraying targets the ear-nose-and-throat sphere of the animal.

14. The method of claim 9, wherein the spraying targets the back, stomach, chest, legs or flanks of the animal.

15. A method of administering a precise volumetric treatment dose of at least one active substance to an animal in need thereof in a controlled and repeated manner, the method comprising administering the at least one active substance with an animal collar comprising a rechargeable spraying device for the at least one active substance, wherein the rechargeable spraying device comprises:

a removable reservoir comprising a wick and the at least one active substance, a nebulization body comprising a piezoelectric spraying mechanism, and a seal providing tightness between said reservoir and said nebulization body;

wherein the rechargeable spraying device is attached to or in the collar;

wherein the rechargeable spraying device can be used for the controlled, repeated administration of the precise volumetric treatment dose of the at least one active substance to the animal in need thereof;

wherein the piezoelectric spraying mechanism comprises a ball-and-socket mechanism;

wherein the piezoelectric mechanism is activated by diffusion of the at least one active substance regardless of the movement or position of the animal; and wherein the rechargeable spraying device diffuses the at least one active substance whether the at least one active substance is positioned horizontally, vertically, or upside down.

16. The method of claim 15, wherein the rechargeable spray device sprays the at least one active substance in a localized manner on a target zone of the animal.

17. The method of claim 16, wherein the spraying targets the ear-nose-and-throat sphere of the animal.

18. The method of claim 15, wherein the rechargeable spraying device's piezoelectric spraying mechanism makes it possible to spray the at least one active substance in a controlled and remote manner.

19. The method of claim 15, wherein the spraying targets the ear-nose-and-throat sphere of the animal.

20. The method of claim 15, wherein the spraying targets the back, stomach, chest, legs or flanks of the animal.

* * * * *